United States Patent Office 3,833,571
Patented Sept. 3, 1974

3,833,571
2-PHENOXYALKANOIC ACID ESTERS AS ANTICHOLESTEROL AGENTS
Norman H. Grant, Wynnewood, and Harvey E. Alburn, West Chester, Pa., assignors to American Home Products Corporation, New York, N.Y.
No Drawing. Division of applications Ser. No. 182,260, Sept. 20, 1971, now Patent No. 3,769,431, and Ser. No. 182,235, Sept. 20, 1971, now Patent No. 3,759,950, which both in turn are a division of application Ser. No. 737,837, June 18, 1969, now Patent No. 3,717,669. Divided and this application Apr. 6, 1973, Ser. No. 348,789
Int. Cl. A61k 27/00
U.S. Cl. 424—274     3 Claims

ABSTRACT OF THE DISCLOSURE

This invention concerns 2-phenoxyalkanoic acid esters which are pharmacologically active as anticholesterol agents.

---

This is a division of application Ser. No. 182,260, filed Sept. 20, 1971, now U.S. Pat. 3,769,431 issued Oct. 30, 1973 and application Ser. No. 182,235 filed Sept. 20, 1971 now U.S. Pat. 3,759,950 issued Sept. 18, 1973. In turn both of these patents are a division of Ser. No. 737,837 filed June 18, 1969 now U.S. Pat. 3,717,669 issued Feb. 20, 1973.

The present invention relates to 2-phenoxyalkanoic acid esters. In particular, this invention concerns 2-phenoxyalkanoic acid alkoxyalkyl esters, 2-phenoxyalkanoic acid succinimido esters and 2-phenoxyalkanoic acid phthalimido esters which in standard and accepted pharmacological tests have demonstrated biological activity as serum cholesterol lowering agents.

The new and novel compounds within the scope of the present invention are exemplified by the following structural formula:

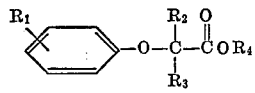

wherein $R_1$ is selected from the group consisting of hydrogen, halogen, lower alkyl and lower alkoxy; $R_2$ and $R_3$ are selected from the group consisting of hydrogen and lower alkyl; and $R_4$ is selected from the group consisting of lower alkoxy(lower)alkyl, succinimido and phthalimido. As employed herein the terms "lower alkyl," "lower alkoxy" and the like are meant to include both branched and straight chain moieties containing from one to about eight carbon atoms. Typical examples of the compounds of this invention are: 2-(p-chlorophenoxy)-2-methylpropionic acid, methoxymethyl ester; 2-(p-chlorophenoxy)-2-methylpropionic acid, succinimido ester; 2-(p-bromophenoxy)-2-methylpropionic acid, succinimido ester; and 2-(p-chlorophenoxy)-2-methylpropionic acid phthalimido ester.

The new and novel 2-phenoxyalkanoic acid, alkoxyalkyl esters of the present invention may be prepared by the process which is hereinafter schematically illustrated:

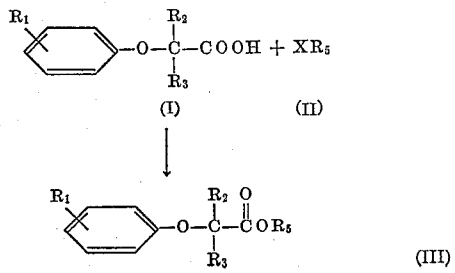

wherein $R_1$, $R_2$, and $R_3$ are defined as above and X is halogen and $R_5$ is lower alkoxy(lower)alkyl. The reaction is effected by admixing an appropriate 2-phenoxyalkanoic acid (I) with a haloalkyl alkylether (II), in the presence of a basic catalyst e.g. triethylamine, in ethyl acetate at about room temperature for a period of about one to about twenty hours.

When the reaction is complete, the resulting 2-phenoxyalkanoic acid alkoxyalkyl ester (III) is separated by conventional procedures. For example, the reaction mixture is filtered, washed with water and concentrated.

The new and novel succinimido and phthalimido esters of these 2-phenoxyalkanoic acids may be prepared by the process which is depicted as follows:

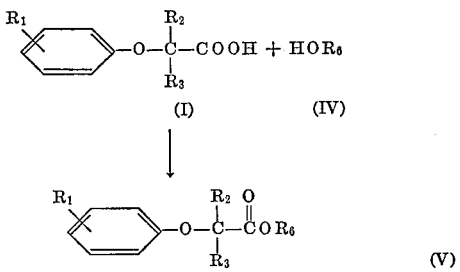

wherein $R_1$, $R_2$, and $R_3$ are defined as above and $R_6$ is succinimido or phthalimido. The reaction is effected by admixing an appropriate 2-phenoxyalkanoc acid (I) with a basic catalyst e.g. triethylamine, in a reaction-inert organic solvent at a temperature below about 0° C. An alkylhalocarbonate e.g. ethylchloroformate is then added to this mixture, the temperature is allowed to equilibrate to about room temperature and the mixture is diluted with ethyl ether. Thereafter, a N-hydroxy succinimide or phthalimide (IV) is added to the reaction mixture with stirring.

When the reaction is complete, the resulting 2-phenoxyalkanoic acid succinimide or phthalimido ester (V) is separated by conventional procedures. For example, the reaction mixture is extracted with an aqueous bicarbonate solution, water and then concentrated to afford the product (V) which can be recrystallized from a suitable solvent e.g. ethyl ether.

The 2-phenoxyalkanoic acid (I) starting materials employed in the above reactions may be prepared by procedures known in the art, for example, the process described by Calimberti, P. and Defranceschi, A. in Gazz. Chim. Ital, 77, 431 (1947) as exemplified in hereinafter Example I. The other reactants e.g. the haloalkyl alkylethers (II) and N-hydroxy succinimide or phthalimide (IV) employed in the above process are commercially available and/or may be prepared by well known chemical procedures. In the above reaction, by the term "reaction-inert organic" solvent is meant any organic solvent that will dissolve the reactants and not interfere with their interaction. Many such solvents will readily suggest themselves to those skilled in the art, e.g. ethyl acetate, chloroform, acetonitrile, dioxan and the like.

The new and novel 2-phenoxyalkanoic acid esters (III) and (V) of the present invention possess valuable pharmacological activity. In particular, these compounds in standard pharmacological procedures demonstrate an ability to reduce serum cholesterol and are useful as anticholesterol agents.

In the pharmacological evaluation of the cholesterol lowering properties of the compounds of this invention the in vivo effects of the compounds are tested as follows:

Male weanling rats are fed a hypercholesterolemic diet for three weeks. Serum cholesterol is determined on 0.01 ml. of serum separated from tail blood collected in a capillary tube. Groups of rats with equal average serum cholesterol are given the test compound orally once a day by syringe for three days. Serum cholesterol is determined in the morning of the fourth day. Anticholesterol activity is demonstrated by a lowering of the serum cholesterol.

The 2-phenoxyalkanoic acid alkoxyalkyl esters (III), the 2-phenoxyalkanoic acid succinimido esters (V) and the 2-phenoxyalkanoic acid phthalimido esters (V) of this invention in the above test procedure when administered orally at a daily dosage of about 30 to about 50 mg./kg. of animal body weight lower the serum cholesterol level in hypercholesterolemic rats by about 45 to about 80 percent in three days.

When the compounds of this invention are employed as serum cholesterol lowering agents they may be administered to warm-blooded animals, e.g., mice, rats, rabbits, dogs, cats, monkeys, etc. alone or in combination with pharmacologically acceptable carriers, the proportion of which is determined by the solubility and chemical nature of the compounds, chosen route of administration and standard biological practice. For example, they may be administered orally in the form containing such excipients as starch, milk sugar, and so forth. They may also be administered orally in the form of solutions or they may be injected parenterally. For parenteral administration they may be used in the form of a sterile solution containing other solutes, for example, enough saline or glucose to make the solution isotonic.

The dosage of the present anticholesterol agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects and preferably at a level that is in the range of from about 40 mg. to about 400 mg. per kilo per day, although as mentioned above variations will occur.

The following examples are given by way of illustration and are not to be construed as limitations of this invention, many variations of which are possible without departing from the scope and spirit thereof.

EXAMPLE I

To 40.0 g. of 2 p-chlorophenol (0.312 mole) dissolved in 382 ml. of acetone (300 g.), there is slowly added 70.0 g. of solid sodium hydroxide and 33.6 ml. of chloroform (50 g.). The resulting mixture is refluxed for four hours and then evaporated until a viscous brown liquid begins to solidify. This solid is redissolved in 300 ml. of water with heating, then acidified to about pH 2.0 with concentrated hydrochloric acid (40 ml.). The resulting brown precipitate is filtered, washed with water, dissolved in 600 ml. of 7% sodium bicarbonate, extracted with ether, treated with charcoal, filtered, washed with water and acidified to pH 4.0 with concentrated hydrochloric acid. The resulting solid is filtered, recrystallized from 500 ml. of a 7% sodium bicarbonate solution to afford 2-(p-chlorophenoxy)-2-methylpropionic acid, m.p. 119° C.

Analysis.—Calc'd for $C_{10}H_{11}O_3Cl$: C, 56.12; H, 5.18; O, 22.43; Cl, 16.57. Found: C, 55.98; H, 4.94; Cl, 16.77.

EXAMPLE II

To a solution of 12.0 g. of 2-(p-chlorophenoxy)-2-methylpropionic acid in 600 ml. of ethylacetate there is added 4.5 g. of chloromethyl methylether, followed by 7.74 ml. of triethylamine. The mixture is stirred at room temperature for one hour and then allowed to stand overnight. The system is filtered, washed with water, and then concentrated to the oily product which weighs 13.4 g. and is 2-(p-chlorophenoxy)-2-methylpropionic acid, methoxymethyl ester.

Analysis.—Calc'd for $C_{12}H_{15}ClO_4$: C, 55.70; H, 5.80; Cl, 13.72. Found: C, 55.54; H, 5.86; Cl, 13.43.

In a similar manner, 2-(p-bromophenoxy)propionic acid and chloromethyl ethyl ester are reacted to yield 2-(p-bromophenoxy)propionic acid, ethoxymethyl ester.

EXAMPLE III

Repeating the procedure of Example II to react an appropriate 2-phenoxyalkanoic acid with a haloalkyl alkylether, the following products are obtained:

2-(p-methoxyphenoxy)-2-methylbutyric acid, methoxyethyl esters;

2-ethyl-2-(m-propoxyphenoxy)valeric acid, propoxymethyl ester;

2 - methyl - 2-(p-toloxy)propionic acid, methoxybutyl ester;

2 - methyl - 2 - phenoxypropionic acid, methoxyheptyl ester;

2-(p-fluorophenoxy)acetic acid, pentoxymethyl ester;

2 - (m-ethoxyphenoxy)-2-propylcaproic acid, hexoxypropyl ester;

2-(o-chlorophenoxy)-2-methylpropionic acid, methoxypropyl ester;

2 - (p-iodophenoxy)-2-methylpropionic acid, ethoxymethyl ester;

2 - (p-ethylphenoxy)-2-methylvaleric acid, methoxymethyl ester; and

2 - (m-butylphenoxy)-2-methylpropionic acid, ethoxymethyl ester.

EXAMPLE IV

A solution of 10.73 g. of 2-(p-chlorophenoxy)-2-methylpropionic acid and 7 ml. of triethylamine in 50 ml. of methylene chloride is chilled to 0° C. There is then added 5 ml. of ethylchloroformate, and the system is stirred and warmed to room temperature. After one hour there is added 50 ml. of ethyl ether, and the system is filtered. The filtrate is adjusted to 100 ml. by addition of ethyl ether and half of this is then stirred with 2 g. of N-hydroxysuccinimide at room temperature. The mixture is extracted three times with 100 ml. portions of 0.1 M $K_2HPO_4$ and then with 10 ml. of water. The ether layer is evaporated to an oil, which solidifies overnight. This product is recrystallized from ethyl ether, giving 2.0 g. of 2-(p-chlorophenoxy-2-methylpropionic acid, succinimido ester.

Analysis.—Calc'd for $C_{14}H_{14}ClNO_5$: C, 53.9; H, 4.49; N, 4.49. Found: C, 53.8; H, 4.44; N, 4.25.

In a similar manner, 2-(p-bromophenoxy)-2-methylpropionic acid is reacted with N-hydroxysuccinimide to yield 2-(p-bromophenoxy)-2-methylpropionic acid, succinimido ester.

EXAMPLE V

A solution of 5.3 g. of 2-(p-chlorophenoxy)-2-methylpropionic acid and 3.5 ml. of triethylamine in 25 ml. of methylene chloride is chilled to 0° C. There is then added 2.5 ml. of ethylchloroformate, and the system is stirred and warmed to room temperature. After two hours there is added 25 ml. of ethyl ether, and the system is filtered. The filtrate is adjusted to 50 ml. by addition of ethyl ether and half of this is then stirred with 1.0 g. of N-hydroxyphthalimide at room temperature. The mixture is extracted three times with 50 ml. portions of 0.1 M $K_2HPO_4$ and then with 10 ml. of water. The ether layer is evaporated and the residue recrystallized from ethyl ether, giving 2-(p-chlorophenoxy)-2-methylpropionic acid, phthalimido ester.

EXAMPLE VI

When the procedure of Examples IV–V is repeated to react an appropriate 2-phenoxyalkanoic acid with N-hydroxysuccinimide or N-hydroxyphthalimide the following compounds are obtained:

2-(o-chlorophenoxy)-2-methylpropionic acid, succinimido ester;

2 - (p-iodophenoxy)-2-methylpropionic acid, phthalimido ester;

2 - (p-ethylphenoxy) - 2-methylvaleric acid, succinimido ester;

2 - (m-butylphenoxy) - 2 - methylpropionic acid, succinimido ester;

2-methyl-2-phenoxypropionic acid, phthalimido ester;

2-(p-fluorophenoxy)acetic acid, succinimido ester; and

2 - (m-ethoxyphenoxy)-2-propylcaproic acid, phthalimido ester.

What is claimed is:

1. A method of reducing serum cholesterol in a warm blooded mammal in need thereof which comprises administering to said mammal orally or parenterally an effective amount for reducing serum cholesterol of a compound of the formula:

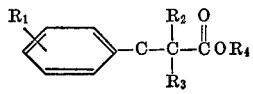

wherein $R_1$ is selected from the group consisting of hydrogen, halogen, lower alkyl and lower alkoxy; $R_2$ and $R_3$ are selected from the group consisting of hydrogen and lower alkyl; and $R_4$ is selected from the group consisting of succinimido and phthalimido.

2. The method of Claim 1 wherein the compound administered is: 2 - (p-chlorophenoxy)-2-methylpropionic acid, succinimido ester.

3. The method of Claim 1 wherein the compound administered is: 2 - (p-chlorophenoxy)-2-methylpropionic acid, phthalimido ester.

References Cited
UNITED STATES PATENTS
3,679,800    7/1972    Brencze _____ 424—274

ALBERT T. MEYERS, Primary Examiner

F. E. WADDELL, Assistant Examiner

U.S. Cl. X.R.

424—308